United States Patent [19]

Leibig

[11] Patent Number: 5,073,200
[45] Date of Patent: Dec. 17, 1991

[54] LOW PRESSURE SYSTEM FOR EXTRACTION OF SOLUBLE MATTER FROM FIBROUS MATERIAL

[75] Inventor: Wilhelm Leibig, Riva, Md.

[73] Assignee: Biotecnologia y Derivados de Morelos, Sa De CV, Mexico

[21] Appl. No.: 507,666

[22] Filed: Apr. 10, 1990

[30] Foreign Application Priority Data

Apr. 21, 1989 [MX] Mexico .................................. 15757

[51] Int. Cl.$^5$ ..................... C13D 1/12; B01D 12/00; B30B 7/04; B30B 15/30
[52] U.S. Cl. ........................................ 127/2; 127/6; 100/42; 100/72; 100/73; 100/74; 100/176; 422/269; 422/292
[58] Field of Search .................. 127/2, 4, 6; 422/267, 422/269, 291, 292, 294; 100/70 A, 42, 72, 73, 74, 155 R, 176

[56] References Cited

U.S. PATENT DOCUMENTS

| | | | |
|---|---|---|---|
| 1,328,090 | 1/1920 | McNeil | 127/2 |
| 3,100,725 | 8/1963 | Smart | 127/2 |
| 4,043,832 | 8/1977 | Leibig et al. | 127/6 |
| 4,543,129 | 9/1985 | Kaether | 127/2 |
| 4,664,716 | 5/1987 | Leibig | 127/6 |
| 4,804,418 | 2/1989 | Gautier | 100/155 R |

Primary Examiner—Theodore Morris
Assistant Examiner—P. L. Hailey
Attorney, Agent, or Firm—Silverman, Cass & Singer, Ltd.

[57] ABSTRACT

An improved system for extracting soluble substances from fibrous material by using a plurality of maceration and compression steps thereby excerting moderate pressure on the fibrous material up to 15 bars.

Arrangements are made to saturate the fibrous material to its maximum absortion potential between each pressure application. Moisture content of the agent fibrous material is finally reduced with the combined application of moderate and high pressure. The application of imbibition liquid in this area and the use of the solvent received for the purpose of maceration in the preeceding extraction steps is made in accordance with the respective concentration of the solvent.

The extraction system can operate without the application of process heat; therefore, a lixiviator is not required. Two or more maceration and compression steps can be located in a module, thus permitting a very compact arrangement of the extraction system.

The extraction time is reduced below 4 minutes, allowing in combination with reduced temperatures, the processing of thermolabile substances. The system is particularly suitable for the extraction of sugar from sugar cane.

This invention relates to a new improved apparatus for removing or extracting, by the use of a suitable solvent or solvents, soluble substances from subdivided fibrous materials as exemplified by the extraction of sugar cane.

8 Claims, 3 Drawing Sheets

LOW PRESSURE SYSTEM FOR EXTRACTION OF SOLUBLE MATTER FROM FIBROUS MATERIAL

BACKGROUND OF THE INVENTION

Existing commercial processes for removing sugar from sugar cane may be classified generally as tandem mill processes and diffusion processes. In tandem mill processes, the fiberized can is repeatedly subjected to high pressure, usually in the range of 200 to 300 kg/cm$^2$ in order to separate the sugar juice from the cane. In diffusion processes, solvent is allowed to percolate through a bed of fiberized cane by gravitational flow to extract soluble substances like sugar solution by lixiviation. Many modifications of the foregoing processes have been made. For example, the imbibition liquid is ordinarily utilized in mill tandem processes; and with it, maceration has been applied to a limited extent to improve extraction efficiency.

Basically, the improvements in mill tandem processes have been made in the direction of using equipment able to exert increasingly higher pressure on the cane with the objective of obtaining improved extraction results. Such measures have resulted in increased power requirements accompanied with increased costs for maintenance and overall operational expenses.

The high pressure utilized in conventional mill tandems allows for only a small maceration rate due to the fact that juice extraction on the front end of a mill tandem utilizing high pressure restricts the amount of maceration. If higher maceration rates could be possible in such mill tandems, the poor drainage capacity of a conventional 3-roller mill would be restrictive.

A moisture content in bagasse higher than 70% by weight creates severe feeding problems and consequently impairment of mill performance. To overcome this deficiency, many devices have been developed in the past in an attempt to improve the feeding of wet bagasse to high pressure mills, but with only limited success. For this reason, tandem mill processes using high pressure and utilizing force-feeding devices are making such equipment only applicable to fibrous materials having a relatively low moisture content.

In addition to the technological problems explained above, any increase in the volume of solvents leads to an undesirable dilution of the extraction fluid leaving the process, which in turn results in an increase of the energy consumption for thermophysical processes as required for sugar or alcohol production.

Sugar cane harvesting methods are tending toward more utilization of mechanical equipment, which in turn is carrying more foreign matter into the extraction process causing increased wear and with it increasing maintenance costs, particularly when high pressure mills are in use. Under such circumstances, the average performance of a mill tandem in view of capacity, extraction, and overall operation costs can be substantially impaired.

During the last 2 decades, diffusion processes have been devised with the objective of replacing mill tandems with their obvious technological deficiencies. Diffusion processes require comparatively more complex and expensive equipment than the mill tandem processes and therefore, they have proven to be particularly feasible for sugar extraction plants having high manufacturing capacities. Extraction efficiency obtained with diffusion processes can be higher than for mill tandems, and therefore, their implementation for certain operations is justifiable.

Since lixiviation is the basic method in a diffusion system the cane must be specially prepared, and the extraction process is rather time consuming requiring 40 to 60 minutes. Heat is applied to the system, and the process temperature is ideally 76° C. with the object of accelerating lixiviation and to prevent adverse bacteriological changes which may affect the solvents and fibrous material during the time period needed for the extraction process.

Nevertheless, exposure of all the materials to time and temperatures involved is causing some destruction of the extractable solubles and a drop in the pH. Continuous operation of a diffusion system is essential; and interruption of this process, even for a short time period can cause a substantial impairment of the extraction results. The rate of lixiviation is closely related to the flow rate of the solvents through the fibrous material and the respective percolation rate can be kept only on a high level when continuous operation is assured.

SUMMARY OF OBJECTIVES OF THE INVENTION

It is an objective of this invention to provide an improved extraction system for removing soluble substances from fibrous materials and which can be adapted to extract sucrose and fermentable sugar from sugar cane.

It is another objective of the invention to provide an extraction system for fibrous materials allowing for a reduced process time, practicable for continuous operation.

It is another objective of the invention to provide for effective removal of soluble material from fibrous matter without using process heat.

It is another objective of the invention to make better use of the imbibition liquid and resulting solvents in preceding extraction steps to improve the extraction result and or to obtain a final solvent with high density.

It is another objective of the invention to reduce the physical dimensions of the extraction system by eliminating a lixiviation process and locating more than one maceration and compression step in one module.

It is another objective of the invention to provide an extraction system that is most economical to build and to operate, requiring a minimum of maintenance.

It is another objective of the invention to further reduce overall energy requirements.

Further objectives and advantages of the system will be apparent to one skilled in the field from the following description and accompanying drawings.

DESCRIPTION OF PREFERRED EMBODIMENT

Figure 1:
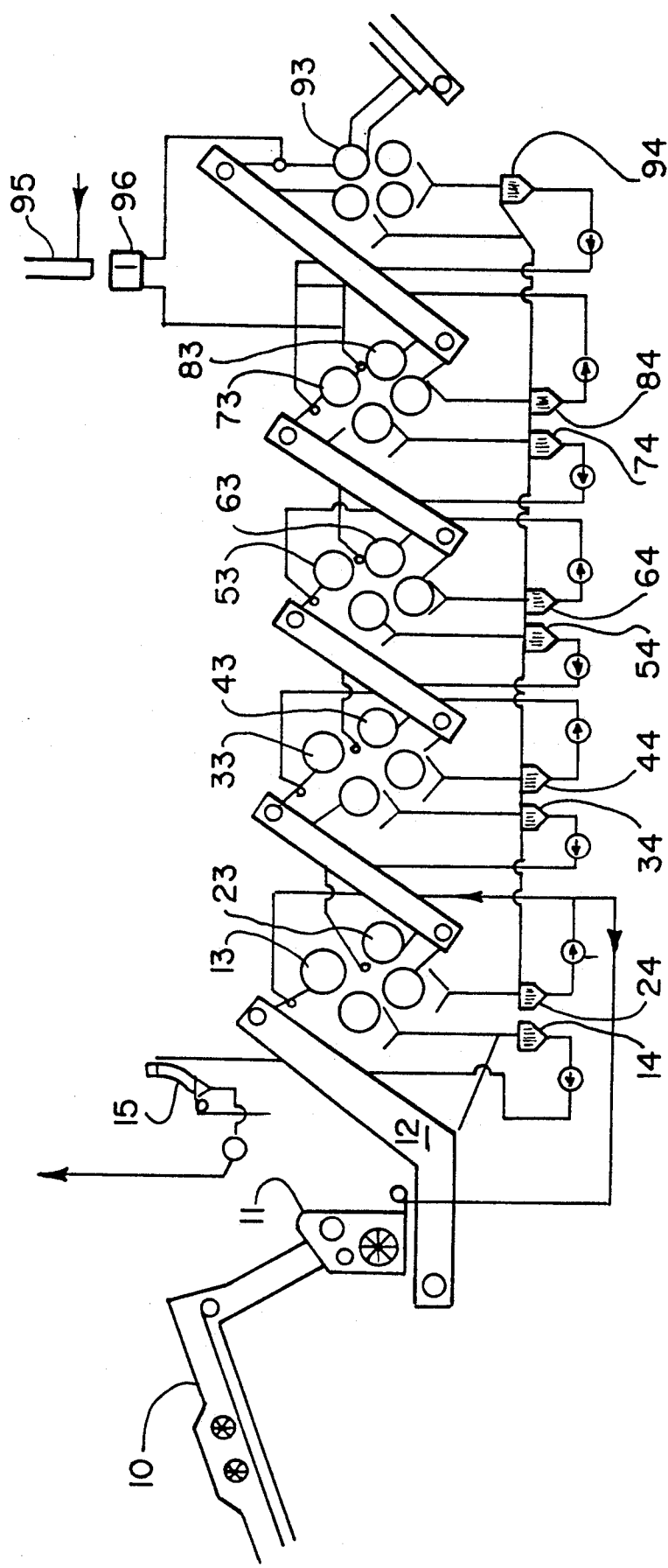
FIG. 1 is showing a flow sheet diagramatically illustrating the operation of the invention.

Given the preparation of the fibrous material for the above mentioned process and with it the rupture of the cell walls, and hence exposure of the cell plasma, it is difficult to achieve in practice, and can be done only with an increasingly high use of mechanical energy, it is thus necessary to apply a process that allows extraction of soluble material by means of multiple maceration and compression steps.

It is thereby important that the maceration rate be high, thus providing the vehicle for the transport of soluble matter. The application of pressure alone, even the highest pressure, without maceration cannot yield satisfactory extraction results.

High maceration rates can be used only when the displacement process allows for a high drainage capability.

Some application of high pressure in the extraction system is however necessary at the end of the process to recover a maximum of solvent and soluble matter and to reduce the moisture content of the fibrous material to a low enough value so that it can be used for other purposes, in particular as a fuel with the best possible energy potential.

With the preferred embodiment it is possible to carry out an extraction process of soluble matter from fibrous material, in particular the extraction of sucrose or fermentable sugars from sugar cane.

Extraction is achieved with a plurality of maceration and compresion (displacement) steps, operating with pressures up to 1.4 tons/dm$^2$ preferably, two rolls are working together in which the lower roll is equipped with a perforated cylindrical surface to allow adequate drainage of the solvent fluid from the fibrous material. The pressure between the rolls is exerted by a hydraulic system acting upon their respective shafts.

The fibrous material leaving each of these compression steps is macerated with solvent received from a compression step downstream in a manner comparable to the compound imbibition system used in conventional mill tandems for the sugar extraction from sugar cane. The flow rate for maceration can be widely changed via the pressure applied in the individual pressure site. Maceration is applied close ahead of each compression site. Thereby intensively mixing with the fibrous material, passing through said material and leaving it via the perforated surface of the lower roll.

After the use of several maceration and compression steps, a conventional high pressure system is used for the final dewatering of the fibrous material leaving the process. Predewatering of the fibrous material can be achieved with a perforated pressure roller acting in conjunction with the top roll of the high pressure system.

Imbibition is applied in part ahead of the press roller and ahead of the last low-compression step, and can be measured and proportionally diverted with a weir box.

The solvent obtained in the area of the press roller and underneath the high pressure system is carried upstream and applied according to its respective density.

The arrangement of this process allows for a process time of less than 4 minutes.

As shown in FIG. 1, cane is received by a conventional unloading equipment and is prepared for extraction with one or two knife sets 10 followed by a fiberizer or hammermill 11. There are various arrangements possible, all having the objective to disintegrate the fibrous material and to disrupt the cell walls in the most efficient manner for the extraction process.

The disintegrated material discharged from the fiberizer 11 is transferred by a maceration carrier 12 to the first low-pressure step 13. Liquid obtained from 13 and that drained beyond the maceration carrier 12 is carried 12 passed over a screening device 15 and is leaving the extractor. Juice from pressure step 23 is applied to the inclined section of maceration carrier 12. This liquid also is leaving the carrier 12 to the screening device 15. The liquids obtained in the following pressure steps downstreams 33, 43, 53, 63, 73 and 83 are fed back to the preceding units.

The imbibition is metered 95 and proportionally diverted 96 and applied upstream to HP mill 93 and pressure step 83. Solvents are flowing from the press roller 83 to container 84 and from there diverted with a splitter box in part ahead of pressure steps 83 and 73. Solvents obtained from HP mill 93 are flowing to container 94 and from there to pressure step 73. Containers 14, 24, 34, 44, 54, 64, 74, 84 and 94 are arranged so as to allow overflow of liquid towards the front end of the extractor in case of overload. Check-flaps (not illustrated) are impeding the flow of liquid in the opposite direction.

Figure 2:
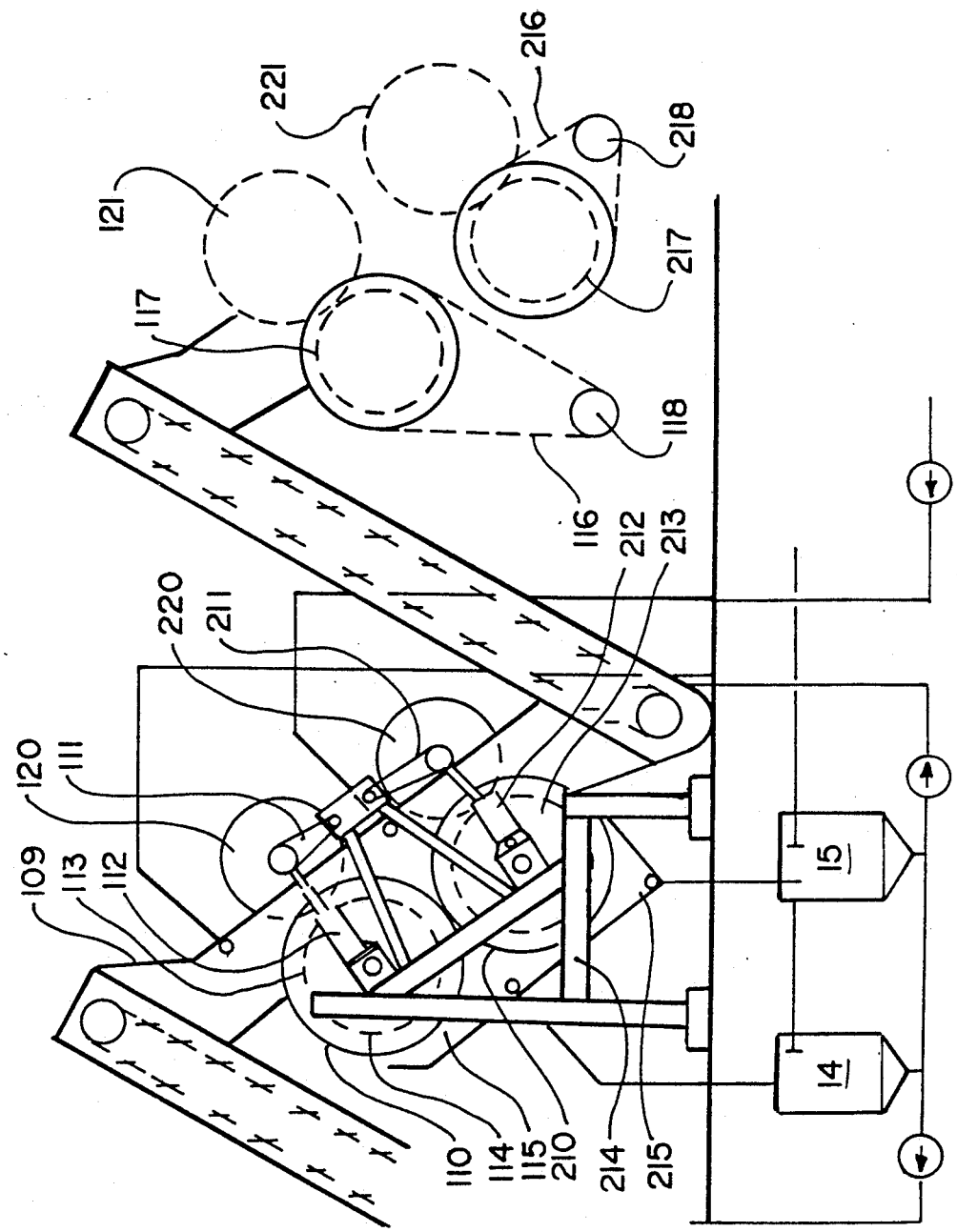
FIG. 2 is a side view of two maceration and compression devices typically located in a module.

FIG. 2 shows in more detail typical low pressure extraction unit as the one previously described in FIG. 1 under positions: 13, 23, 33, 43, 53, 63, 73 and 83.

Typically the roller pairs 110/120 and 210/220 are located in a common steel structure. Articulations 111 and 211 allow rollers 120 and 220 to float in an axial plane to their counter parts 110/210 according to the fibrous material bed that is fed via chute 109 at the entrance of roller pair 110/120. The pressure exerted between the roller pairs is controlled by the hydraulic cylinder pairs 112 and 212.

The cylindrical surfaces 113 and 213 of rollers 110 and 210 are perforated, allowing the drainage of liquid into plennum chambers 114 and 214 of rollers 110 and 210. Inner plennum of rollers 110 and 210 is provided with deflectors to permit an efficient discharge of the drainage liquid and of the solids contained in it, in axial directions. Drainage liquid is finally collected in trays 115 and 215 and flow typically towards containers 14/24 as is shown in FIG. 1.

Pairs of rollers 110/120 and 210/220 are driven independently via drive chains 116 and 216 and the respective speed reducers 118 and 218 located at floor level.

The roller pairs 110/120 and 210/220 are interconnected by pinions 117/121 and 217/221 insuring a proper power transmission over a wide range of floating required by the rollers.

Figure 3:
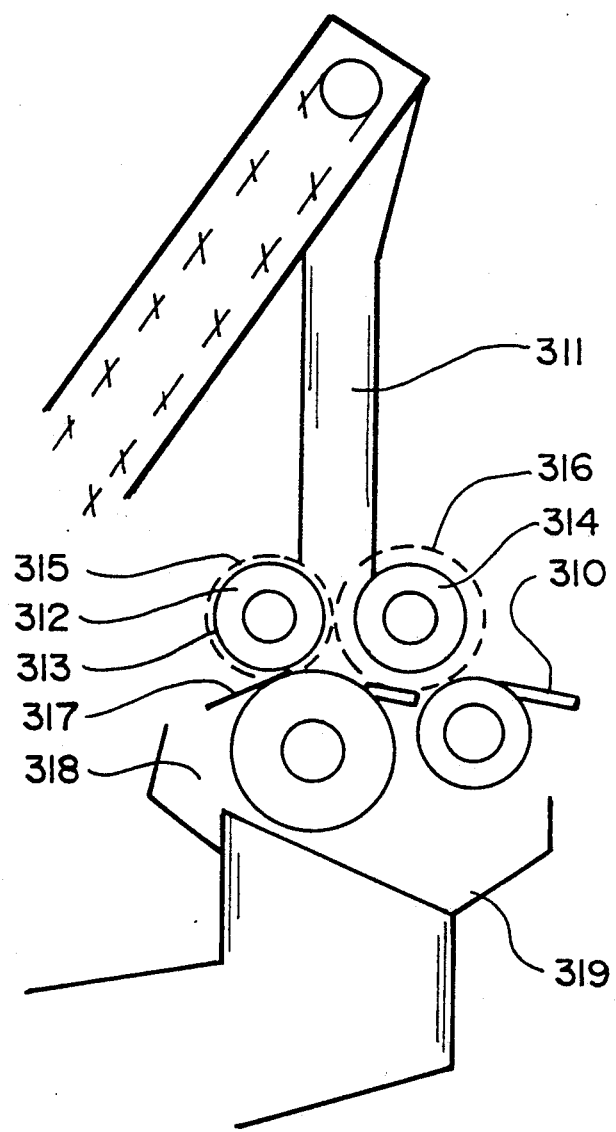
FIG. 3 is a side view of the high pressure compression device and the perforated predewatering roll.

FIG. 3 shows a high pressure mill 310 equipped with a pressure feeding device consisting of feed chute 311 and feed roll 312. Feed roll 312 is provided of a perforated cylindrical surface 113 similar to the one described for rollers 110 and 210 of FIG. 2.

Roller 312 is driven via a pair of pinions 315/316 of upper roll 314 of mill 310.

The pressure fluid obtained of the interaction of feed roll 312 and upper roller 314 can be separated by deflector plate 317 from the pressure fluid obtained by the high pressure mill 310. The respective flow of fluids is collected in trays 316 and 317 and transported from there to maceration points up stream of the extractor system according to respective physical proportions.

This invention is not to be limited by the description since further advantages will be apparent to one skilled in the art.

What is claimed is:

1. Apparatus for extraction of soluble matter from fibrous material, comprising:
   a) means for maceration of disintegrated fibrous material to extract soluble matter;
   b) means for passing the first macerate to compression step;

c) first low pressure compression means for the first macerate and for passing said material with a conveyor to the next maceration step;
d) means to collect the first expressed fluid and maceration fluid from the disintegrated material;
e) means to separate foreign matter and fibrous residuals from the expressed and maceration fluids;
f) means to return separated matter to the first maceration step;
g) means for second maceration for adding expressed fluid from subsequent low pressure compression means and to produce a second macerate, and for passing said second macerate to a second low pressure compression means;
h) means to collect the second and subsequent expressed fluid;
i) means for passing a variable portion of said expressed fluid to the first maceration means and to the macerate entering the first compression step;
j) means for third maceration for adding expressed fluid from subsequent low pressure compression means to produce a third macerate and for passing said third macerate to a fourth low pressure compression means;
k) at least one or a plurality of additional sequences of maceration means, low pressure compression means, fluid collecting means;
l) means for passing the fibrous material from the last low pressure compression means to a high pressure dewatering means;
m) means for final maceration of fibrous material entering the high pressure dewatering means;
n) means for passing a variable portion of the final maceration fluid to produce macerate entering to the high pressure dewatering means;
o) means for passing a variable portion of the final maceration fluid to produce macerate entering the last low pressure compression means;
p) means for predewatering the macerate entering the high pressure dewatering means;
q) means for passing fluid from predewatering means to macerate entering the last low pressure compression means;
r) high pressure dewatering means for dewatering final macerate and to express final fluid;
s) means for passing final fluid obtained from high pressure dewatering means to macerate entering the last low compression step;
t) means to allow over flow of the expressed fluid collected from all compression means only toward the front end of the process means.

2. An apparatus according to claim 1 characterized by the fact that a maceration carrier is used to produce the macerate entering the first low pressure compression step.

3. An apparatus according to claim 1 characterized by the fact that a plurality of maceration and compression steps are combined in one module.

4. An apparatus according to claim 1 characterized by the fact that the collectors for liquid obtained from the compression devices are connected to allow liquid flow toward the front end of the process only, and that said flow is prevented to move in the opposite direction.

5. An apparatus according to claim 1 to improve the dewatering effect and capacity of a high pressure compression device by using a predewatering roll acting in conjunction with the top roller of said high pressure compression device.

6. An apparatus according to claim 5 characterized by the fact that the predewatering roll is provided with a perforated roll having an open surface of at least 26% of the cylindrical surface at said roll.

7. An apparatus according to claim 5 characterized by the fact that the fluid obtained from the predewatering roll located at the high pressure dewatering device can be separated from the fluid obtained from said dewatering high pressure unit.

8. The apparatus according to claim 1 wherein the extraction of soluble matter from fibrous material substantially is performed at room temperature and without any heating of any of said fluids.

* * * * *

UNITED STATES PATENT AND TRADEMARK OFFICE
CERTIFICATE OF CORRECTION

PATENT NO. : 5,073,200

DATED : December 17, 1991

INVENTOR(S) : Wilhelm Leibig

It is certified that error appears in the above-identified patent and that said Letters Patent is hereby corrected as shown below:

Column 3, lines 66-67, delete "carried 12";

Column 4, line 58, change "proportions" to --properties--;

Column 6, line 9, change "over flow" to --overflow--.

Signed and Sealed this

Thirteenth Day of April, 1993

*Attest:*

STEPHEN G. KUNIN

*Attesting Officer*     *Acting Commissioner of Patents and Trademarks*